(12) United States Patent
Cabello-Fuentes

(10) Patent No.: US 6,419,887 B1
(45) Date of Patent: Jul. 16, 2002

(54) PROCESS FOR THE TREATMENT OF RESIDUAL LIQUORS FROM THE AMMONIATION AND CARBONATION OF ALKALI METAL SALTS

(76) Inventor: José Cabello-Fuentes, Calle 8 Lote 3ª Manzana 26, Colonia Petrolera, Minatitlán, Veracruz, C.P. (MX), 96850

( * ) Notice: Subject to any disclaimer, the term of this patent is extended or adjusted under 35 U.S.C. 154(b) by 0 days.

(21) Appl. No.: 09/566,639

(22) Filed: May 8, 2000

(51) Int. Cl.⁷ .............................. C01D 1/32; C01D 7/00; C01D 5/00; C01B 21/48; C01C 1/24
(52) U.S. Cl. ..................... 423/199; 423/202; 423/395; 423/396; 423/421; 423/422; 423/423; 423/545; 423/549; 423/551; 423/424
(58) Field of Search ................... 423/199, 202, 423/395, 396, 421, 422, 423, 545, 549, 551, 424

(56) References Cited

U.S. PATENT DOCUMENTS 3,172,845 A * 3/1965 Manning
3,449,067 A * 6/1969 Schmitt et al.
3,734,709 A * 5/1973 Pischinger et al.
5,275,794 A * 1/1994 Luna

FOREIGN PATENT DOCUMENTS

| GB | 16455 | * of 1910 |
| GB | 116321 | * 5/1918 |

* cited by examiner

*Primary Examiner*—Steven Bos
(74) *Attorney, Agent, or Firm*—Abelman, Frayne & Schwab

(57) ABSTRACT

A process for the treatment of residual liquors from the ammoniation and carbonation of alkali metal salts containing ammonium salts, sodium salts, soluble sodium bicarbonate, ammonium bicarbonate and water and producing purified ammonium salts, comprising the steps of: eliminating the sodium bicarbonate, and ammonium bicarbonate mixed in the residual liquor by mixing sulfuric acid with the residual liquor in order to obtain a solution of an ammonium salt and a sodium salt; and separating the sodium salt from the solution or mixing the solution with sodium chloride crystals in order to obtain a magma containing sodium salt crystals and ammonium chloride crystals and separating the sodium salt crystals and the ammonium chloride crystals from the magma.

20 Claims, No Drawings

PROCESS FOR THE TREATMENT OF RESIDUAL LIQUORS FROM THE AMMONIATION AND CARBONATION OF ALKALI METAL SALTS

BACKGROUND OF THE INVENTION

The present invention refers to processes for the treatment of residual liquors, and more particularly to a process for the treatment of residual liquors from the ammoniation and carbonation of alkali metal salts for producing ammonium salts.

Field of the Invention

In agriculture, a great variety of substances are used as fertilizer. An example of the above referred substances is sodium nitrate, which has the characteristics of a good quality fertilizer and abounds in natural form in countries such as Chile. In fact the sodium nitrate was the first nitrogenous mineral fertilizer used by the human been.

The nitrogen contained in the Chilean nitrate can be totally assimilated by plants, but despite its abundance, it has two basic disadvantages:

The first disadvantage of the sodium nitrate is related to its high sodium content (36.4% expressed as $Na_2O$) which significantly raises the salinity of the soil, and thus decreases the productivity of the farm.

The second disadvantage of the sodium nitrate is related to its low nutrient content, since it contains only 16.5% of nitrogen compared with the nitrogen content of a good quality nitrogenous fertilizer which is about 46.4%, or to the nitrogen content of the ammonium nitrate which is about 35.0%. When a fertilizer has a low nutrient contents a higher quantity of fertilizer is needed and therefore the fertilization costs by nutrient unit are higher than the fertilization costs when using a good quality fertilizer.

As it was previously described, the ammonium nitrate has a nutrient content of 35%, which makes this substance a very suitable fertilizer for commercial purposes.

With regard to the ammonium nitrate, there are actually many commercial processes for its production, which use as raw materials ammonium and nitric acid. The main differences between those processes are related to the design of the reaction equipment used, which has influence on the process performance. A good reaction equipment means an overall satisfactory performance and a good use of the energy generated by the reactions. Another difference between those processes is related to the appearance of the final product, which may be shaped like pearls or granules of different densities and porosities, or may be diluted in a solution together with other fertilizer compounds such as the Urea (UAN 32) in order to be irrigated.

When the sodium nitrate was partially displaced from the market by other nitrogenous fertilizers due to its low nutrient content and its high sodium content, there were developed alternative processes in order to eliminate its sodium content and raise its nutrient content. Thanks to these processes, it is avoided the waste of a natural resource having a high value.

In one of these processes, the sodium is substituted with potassium, which is the third element of the so-called "major nutrients" for plants, being the nitrogen the first element and the phosphorus the second. Said process comprises mixing potassium chloride and sodium nitrate solutions on such proportions that a double crystallization is induced by partially evaporating the water contained in said solutions. The sodium chloride is crystallized before the potassium nitrate. By this process, there are eliminated ions which are harmful for the soil, such as chlorides and sodium.

In other known process, the sodium nitrate is reacted with sulfuric acid in order to be transformed on nitric acid which is then reacted with ammonium in order to produce ammonium nitrate and sodium sulfate which is separated by crystallization. This process is only suitable when there are plenty of cheap disposals of sodium nitrate and sulfuric acid available and when the cost of the sodium sulfate is very high.

In view of the abundance of the sodium nitrate and the benefits of the ammonium nitrate, applicants developed a process for the treatment of residual liquors from the ammoniation and carbonation of alkali metal salts -SOLVAY process—containing an ammonium salt mixed with a sodium salt, soluble sodium bicarbonate, and water, and producing ammonium salts.

Applicants process comprises the steps of: eliminating the sodium bicarbonate, and ammonium bicarbonate mixed in the residual liquor by mixing sulfuric acid with the residual liquor in order to obtain a solution of an ammonium salt and a sodium salt; and separating the sodium salt from the ammonium salt solution or mixing the solution of an ammonium salt and a sodium salt with sodium chloride crystals in order to obtain a magma containing sodium salt crystals and ammonium chloride crystals and separate the sodium salt crystals and the ammonium chloride crystals from the magma.

The sodium bicarbonate and the sodium carbonate may also be produced world-wide by a process called "Dual-salt Ammonium Chloride Process", which is in fact, a variant of the "SOLVAY" process, in which the ammonium, carbon dioxide, calcium carbonate and sodium chloride are used as raw materials, by which it is obtained a by-product comprising a solution of ammonium chloride.

Applicant process in comparison with the SOLVAY process, uses as sodium source, a sodium salt such as sodium nitrate by which it is produced ammonium nitrate which is a fertilizer having a higher nitrogen content than the ammonium chloride (35.0% of nitrogen content versus a 26.0% respectively). Among other differences between the SOLVAY process and applicants process are:

By the use of a sodium salt instead of sodium chloride there are obtained solutions with higher concentration of ammonium nitrate or ammonium chloride respectively, thus reducing evaporation costs. Furthermore, if the ammonium nitrate is enriched with urea it may be commercialized as a nitrogenous solution.

In applicant's process, thanks to the addition of sulfuric acid to the waters generated by the filtration of the sodium bicarbonate, it is totally used the sodium contained in the sodium nitrate, transforming the nitrates on ammonium nitrate, and additionally producing sodium sulfate.

The ammonium nitrate has many advantages compared with the ammonium chloride when there are used as fertilizer, thanks to the fact that the 50% of its nitrogen content remains in nitric form, which is immediately available for the plants when it is applied to the soil, which it is not possible when used in ammonium form because it has to be converted to a nitric form.

The transformation of nitrogen ammoniacal forms on nitric forms, is a natural phenomenon, which occurs in the soil by the enzymatic and bacteriologic reaction of the substrates contained in the soil. Therefore, if the bacteriologic activity of the ground is slow, —which occurs in cold climates—the ammoniacal nitrogen can not be properly used by the plants since a low rate of transformation of ammoniacal forms to nitric forms generates nitrogen loses due to de-nitrification, leaching and hydrolysis phenomena and to the evaporation of the ammonium before the plant is able to assimilate the ammoniacal nitrogen.

The ammonium chloride has a lower demand as a fertilizer compared to other fertilizers, mainly because certain cultivates such as tobacco, vegetables and some fruit trees are sensitive to the chloride ion.

Furthermore, the process of the present invention has some advantages compared with processes for the production of ammonium nitrate which use nitric acid as raw material:

The process of the present invention uses less energy that the ammoniac catalytic combustion processes.

The above referred processes consume an important volume of water in order to cool the absorption tower into which is transformed the nitrous oxides on nitric oxides which then have to be reacted with water in order to produce nitric acid, because during the ammoniac catalytic combustion processes a temperature of approximately 900° C. is generated.

The plant in which are carried out the ammoniac combustion processes has to be equipped with expensive and sophisticated anti-pollution equipment in order to avoid nitrous gas emissions to the atmosphere. In comparison, with applicants process by the use of sodium nitrate for the production of ammonium nitrate it is avoided the emission of polluting residues.

SUMMARY OF THE INVENTION

It is therefore a main objective of the present invention, to provide a process for the treatment of residual liquors from the ammoniation and carbonation of alkali metal salts which produces solutions with a high concentration of ammonium salts, thus reducing evaporation costs.

It is also a main objective of the present invention, to provide a process of the above disclosed nature in which by the addition of sulfuric acid to the waters generated by the filtration of the sodium bicarbonate, it is totally used the sodium contained in the sodium nitrate, transforming the nitrates on ammonium nitrate, and additionally producing sodium sulfate.

It is an additional objective of the present invention to provide a process of the above disclosed nature which uses less energy than the ammoniac catalytic combustion processes.

It is another main objective of the present invention, to provide a process of the above disclosed nature in which the use of sodium nitrate for the production of ammonium salts does not generate polluting residues.

It is still another objective of the present invention, to provide a process of the above disclosed nature which does not consume great volumes of water.

These and other objectives and advantages of the present invention will be apparent to those persons having ordinary skill in the art, from the following detailed description of the invention.

DETAILED DESCRIPTION OF THE INVENTION

The invention will be described by making reference to a preferred embodiment of the process for the treatment of residual liquors from the ammoniation and carbonation of alkali metal salts containing approximately 50% by weight of ammonium nitrate mixed with unreacted sodium nitrate, soluble sodium bicarbonate, unreacted ammonium bicarbonate and water for producing ammonium salts, comprising the steps of:

eliminating the compounds mixed in the residual liquor by feeding sulfuric acid and said liquor into a crystallizer in order to obtain a solution of ammonium nitrate and insoluble sodium sulfate in accordance with the following reactions:

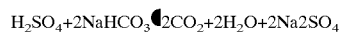

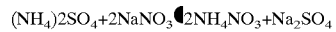

The heat generated by the above referred reactions is removed from the system by an endothermic evaporation of a fraction of the water contained in the solution which represents a significant save of energy in the production process.

Separating the insoluble sodium sulfate from the ammonium nitrate and ammonium sulfate solution by centrifugation.

With the use of sulfuric acid, all the unreacted sodium chloride produced in the carbonation tower by the ammoniation and carbonation of alkali metal salts and the SOLVAY process, is transformed on sodium sulfate which may be separated as by product. Additionally, the sodium sulfate may be recycled to the process in order to obtain an ammoniated solution of sodium sulfate.

Furthermore, the process of the present invention may be applied for the treatment of residual liquors from the ammoniation and carbonation of alkali metal salts containing unreacted sodium sulfate instead of unreacted sodium nitrate, by which it is obtained a solution of ammonium sulfate and sodium sulfate.

If the process is to be applied for the treatment residual liquors containing unreacted sodium sulfate instead of unreacted sodium nitrate, the sulfated solution obtained can be transferred to a reactor having agitating means operated to a temperature of between 55–105° C. preferably at 85°C. in which there are feed sodium chloride crystals in order to be reacted with the ammonium sulfate contained in the sulfated solution by which it is obtained a magma containing sodium sulfate and ammonium chloride crystals in accordance with the following reaction:

The residence period of the reagents inside the reactor is between 5 to 300 minutes, preferably 120 minutes in order to complete the reaction at approximately 90%;

The sodium sulfate crystals obtained are separated from the magma by centrifugation or filtration, at a temperature of between about 30° C. and 115° C. preferably 85° C. in order to separate the sodium sulfate crystals in the form of anhydrous sodium sulfate and in order to avoid the crystallization of the ammonium chloride together with the sodium sulfate if the solution were cooled;

once the sodium sulfate crystals are separated, the filtered or centrifuged solution is cooled to a temperature of between 28° C. to 40° C. preferably 38° C., in order to crystallize the ammonium chloride.

The ammonium chloride crystals are separated from the solution, and the remaining solution may be used to prepare an ammoniated solution used by the SOLVAY process in order to be feed to the carbonation tower.

The ammonium chloride crystals may be commercialized in the fertilizer market, since the sulfate crystals obtained have a purity greater than 97% with a minimum nitrogen content of 25%, or may be transferred to a pre reactor in which it is fed to a lime slurry in order to transform the ammonium chloride crystals to calcium chloride and ammonium hydroxide.

Finally it must be understood that the process for the treatment of residual liquors from the ammoniation and carbonation of alkali metal salts of the present invention, is not limited exclusively to the above described and illustrated embodiments and that the persons having ordinary skill in the art can, with the teaching provided by this invention, make modifications to the process of the present invention, which will clearly be within the true inventive concept and scope of the invention which is claimed in the following claims.

I claim:

1. A process for the treatment of residual liquors from the ammoniation and carbonation of alkali metal salts containing an ammonium salt mixed with unreacted sodium nitrate or sodium sulfate, soluble sodium bicarbonate, unreacted ammonium bicarbonate and water for producing purified ammonium salts, comprising the steps of:
   a) mixing sulfuric acid with the residual liquor in order to obtain a solution of an ammonium salt and an insoluble sodium salt;
   b) separating the sodium salt from the salt solution obtained in step a).

2. The process as claimed in claim 1, wherein the sodium salt is sodium nitrate.

3. The process as claimed in claim 1, wherein the sodium salt obtained in step a) is sodium sulfate.

4. The process as claimed in claim 1, wherein the ammonium salt is ammonium sulfate.

5. The process as claimed in claim 1, wherein the ammonium salt is ammonium nitrate.

6. The process as claimed in claim 1, wherein the residual liquors from the ammoniation and carbonation of alkali metal salts contain approximately 50% by weight of an ammonium salt mixed with unreacted sodium nitrate or sodium sulfate, soluble sodium bicarbonate, unreacted ammonium bicarbonate and water.

7. The process as claimed in claim 1, wherein the step a) is carried out in a crystallizer.

8. The process as claimed in claim 1, wherein the mixing between the residual liquors from the ammoniation and carbonation of alkali metal salts and the sulfuric acid produce heat which is removed by an endothermic evaporation of a fraction of the water contained in the solution.

9. The process as claimed in claim 1, wherein the separation of the sodium salt from the ammonium nitrate solution is made by centrifugation.

10. The process as claimed in claim 1, wherein the sodium salt is recycled to step a) of the process.

11. The process as claimed in claim 1, wherein the solution obtained in step a) is mixed with sodium chloride crystals to obtain a magma containing sodium sulfate and ammonium chloride crystals.

12. The process as claimed in claim 11 wherein the mixing of the solution with the sodium chloride crystals is carried out inside a reactor having agitating means operated at a temperature of between 55° C.–105° C.

13. The process as claimed in claim 12 wherein the residence period of the reagents inside the reactor is between 5 to 300 minutes.

14. The process as claimed in claim 11, wherein the sodium sulfate crystals are separated from the magma at a temperature of between about 30° C. and 115° C. in the form of an anhydrous sodium sulfate.

15. The process as claimed in claim 11, wherein the remaining magma after the separation of the sodium sulfate crystals, is cooled to a temperature of between 28° C. to 40° C. to crystallize the ammonium chloride.

16. The process as claimed in claim 11, wherein the ammonium chloride crystals are transferred to a pre-reactor into which is fed a lime slurry to obtain calcium chloride and ammonium hydroxide.

17. The process as claimed in claim 11 wherein the mixing of the solution with the sodium chloride crystals is carried out inside a reactor having agitating means operated at a temperature of 85° C.

18. The process as claimed in claim 12 wherein the residence time of the reagents inside the reactor is 120 minutes.

19. The process as claimed in claim 11, wherein the sodium sulfate crystals are separated from the magma at a temperature of 85° C. in the form of anhydrous sodium sulfate.

20. The process as claimed in claim 19, wherein the magma remaining after the separation of the sodium sulfate crystals, is cooled to a temperature of 38° C., in order to crystalize the ammonium chloride.

* * * * *